United States Patent
Mohtar et al.

(10) Patent No.: US 9,777,640 B2
(45) Date of Patent: Oct. 3, 2017

(54) ADJUSTABLE-TRIM CENTRIFUGAL COMPRESSOR, AND TURBOCHARGER HAVING SAME

(71) Applicant: Honeywell International Inc., Morristown, NJ (US)

(72) Inventors: Hani Mohtar, Lorraine (FR); William Joseph Smith, Gardena, CA (US); Stephane Pees, Meurthe-et-Moselle (FR); Dominique Petitjean, Julienrupt (FR); Quentin Roberts, Meurthe et Moselle (FR)

(73) Assignee: Honeywell International Inc., Morris Plains, NJ (US)

(*) Notice: Subject to any disclaimer, the term of this patent is extended or adjusted under 35 U.S.C. 154(b) by 311 days.

(21) Appl. No.: 14/532,278

(22) Filed: Nov. 4, 2014

(65) Prior Publication Data

US 2016/0123333 A1    May 5, 2016

(51) Int. Cl.
*F04D 27/02* (2006.01)
*F02C 9/16* (2006.01)
(Continued)

(52) U.S. Cl.
CPC ............. *F02C 9/16* (2013.01); *F02B 37/225* (2013.01); *F04D 27/0253* (2013.01);
(Continued)

(58) Field of Classification Search
CPC .. F04D 25/045; F04D 29/464; F04D 29/4213; F04D 27/0253; F04D 25/02;
(Continued)

(56) References Cited

U.S. PATENT DOCUMENTS

| | | | |
|---|---|---|---|
| 7,350,356 B2 * | 4/2008 | Sumser | F01D 17/143 415/157 |
| 2011/0002770 A1 * | 1/2011 | Bywater | F02B 37/16 415/1 |

FOREIGN PATENT DOCUMENTS

| | | |
|---|---|---|
| DE | 102010026176 A1 | 1/2012 |
| DE | 102011121996 B4 | 6/2013 |

(Continued)

OTHER PUBLICATIONS

Machine Translation of EP 1947299 A2 to Jegel et al provided by Applicant in IDS.*

(Continued)

*Primary Examiner* — Peter J Bertheaud
*Assistant Examiner* — Dnyanesh Kasture
(74) *Attorney, Agent, or Firm* — John C. James

(57) ABSTRACT

A centrifugal compressor for a turbocharger includes an inlet-adjustment mechanism in an air inlet for the compressor, operable to move between an open position and a closed position in the air inlet. The inlet-adjustment mechanism includes an axially elongated ring. In the open position, the radially outer surface of the ring is spaced from a tapering inner surface of the air inlet so that air can flow in an annular passage between the tapering surface and the ring. In the closed position, the ring abuts the tapering surface to close off the annular passage, whereby the effective inlet diameter is then defined by the inner diameter of the ring at its trailing edge. Movement of the inlet-adjustment mechanism from the open position to the closed position is effective to shift the compressor's surge line to lower flow rates.

8 Claims, 12 Drawing Sheets

(51) Int. Cl.
*F04D 29/42* (2006.01)
*F04D 29/46* (2006.01)
*F02B 37/22* (2006.01)
*F02B 37/12* (2006.01)

(52) U.S. Cl.
CPC ....... *F04D 29/4213* (2013.01); *F04D 29/464* (2013.01); *F02B 2037/125* (2013.01); *F05D 2220/40* (2013.01); *F05D 2250/51* (2013.01); *Y02T 10/144* (2013.01)

(58) Field of Classification Search
CPC ...... F04D 17/10; F04D 27/0246; F04D 27/02; F02B 37/225; F02B 2037/125; F02B 37/16; F02C 9/20; F02C 6/12; F02C 9/16; F01D 17/14; F01D 17/146; F01D 17/141; F01D 17/143; F05D 2250/51; F05D 2220/40; Y02T 10/144
See application file for complete search history.

(56) References Cited

FOREIGN PATENT DOCUMENTS

| EP | 1947299 A2 | 7/2008 |
| JP | 3719337 B2 | 9/2005 |
| WO | 2013074503 A1 | 5/2013 |
| WO | 2015091268 A1 | 6/2015 |

OTHER PUBLICATIONS

Extended Search Report from the EPO in application No. EP 15192473.5 dated Mar. 24, 2016.

* cited by examiner

ADJUSTABLE-TRIM CENTRIFUGAL COMPRESSOR, AND TURBOCHARGER HAVING SAME

BACKGROUND OF THE INVENTION

The present disclosure relates to centrifugal compressors, such as used in turbochargers, and more particularly relates to centrifugal compressors in which the effective inlet area or diameter can be adjusted for different operating conditions.

An exhaust gas-driven turbocharger is a device used in conjunction with an internal combustion engine for increasing the power output of the engine by compressing the air that is delivered to the air intake of the engine to be mixed with fuel and burned in the engine. A turbocharger comprises a compressor wheel mounted on one end of a shaft in a compressor housing and a turbine wheel mounted on the other end of the shaft in a turbine housing. Typically the turbine housing is formed separately from the compressor housing, and there is yet another center housing connected between the turbine and compressor housings for containing bearings for the shaft. The turbine housing defines a generally annular chamber that surrounds the turbine wheel and that receives exhaust gas from an engine. The turbine assembly includes a nozzle that leads from the chamber into the turbine wheel. The exhaust gas flows from the chamber through the nozzle to the turbine wheel and the turbine wheel is driven by the exhaust gas. The turbine thus extracts power from the exhaust gas and drives the compressor. The compressor receives ambient air through an inlet of the compressor housing and the air is compressed by the compressor wheel and is then discharged from the housing to the engine air intake.

Turbochargers typically employ a compressor wheel of the centrifugal (also known as "radial") type because centrifugal compressors can achieve relatively high pressure ratios in a compact arrangement. Intake air for the compressor is received in a generally axial direction at an inducer portion of the centrifugal compressor wheel and is discharged in a generally radial direction at an exducer portion of the wheel. The compressed air from the wheel is delivered to a volute, and from the volute the air is supplied to the intake of an internal combustion engine.

The operating range of the compressor is an important aspect of the overall performance of the turbocharger. The operating range is generally delimited by a surge line and a choke line on an operating map for the compressor. The compressor map is typically presented as pressure ratio (discharge pressure Pout divided by inlet pressure Pin) on the vertical axis, versus corrected mass flow rate on the horizontal axis. The choke line on the compressor map is located at high flow rates and represents the locus of maximum mass-flow-rate points over a range of pressure ratios; that is, for a given point on the choke line, it is not possible to increase the flow rate while maintaining the same pressure ratio because a choked-flow condition occurs in the compressor.

The surge line is located at low flow rates and represents the locus of minimum mass-flow-rate points without surge, over a range of pressure ratios; that is, for a given point on the surge line, reducing the flow rate without changing the pressure ratio, or increasing the pressure ratio without changing the flow rate, would lead to surge occurring. Surge is a flow instability that typically occurs when the compressor blade incidence angles become so large that substantial flow separation arises on the compressor blades. Pressure fluctuation and flow reversal can happen during surge.

In a turbocharger for an internal combustion engine, compressor surge may occur when the engine is operating at high load or torque and low engine speed, or when the engine is operating at a low speed and there is a high level of exhaust gas recirculation (EGR). Surge can also arise when an engine is suddenly decelerated from a high-speed condition. Expanding the surge-free operation range of a compressor to lower flow rates is a goal often sought in compressor design.

BRIEF SUMMARY OF THE DISCLOSURE

The present disclosure describes mechanisms and methods for a centrifugal compressor that can enable the surge line for the compressor to selectively be shifted to the left (i.e., surge is delayed to a lower flow rate at a given pressure ratio). One embodiment described herein comprises a turbocharger having the following features:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air generally axially into the inducer portion of the compressor wheel, the compressor housing further defining a volute for receiving compressed air discharged generally radially outwardly from the compressor wheel, the air inlet having an inner surface a portion of which defines a sliding surface that extends for an axial length along a downstream axial direction, followed by a shroud surface that is adjacent to outer tips of the blades of the compressor wheel; and a compressor inlet-adjustment mechanism disposed in the air inlet of the compressor housing and movable between an open position and a closed position.

The inlet-adjustment mechanism comprises an axially elongated ring whose inner surface becomes smaller in diameter in a downstream direction toward the compressor wheel, the ring terminating at a trailing edge. The inner diameter of the ring at the trailing edge is smaller than an inner diameter of the shroud surface of the compressor housing at the inducer portion of the compressor wheel. The ring is arranged so that when the inlet-adjustment mechanism is in the open position the trailing edge of the ring is axially spaced relatively farther upstream from the inducer portion such that an effective diameter of the air inlet at the inducer portion is determined by the shroud surface, and when the inlet-adjustment mechanism is in the closed position the trailing edge of the ring is axially spaced relatively closer to the inducer portion of the compressor wheel such that the effective diameter of the air inlet at the inducer portion is determined by the inner diameter of the trailing edge of the ring.

In some embodiments the air inlet further defines a tapering inner surface that follows the sliding surface and extends for an axial length along the downstream axial direction, the tapering inner surface becoming smaller in diameter in the downstream axial direction. In such embodiments the ring of the inlet-adjustment mechanism in the open position is spaced from the tapering surface of the air inlet such that there is an annular passage between the tapering surface and the ring for a flow of air therethrough, and when the inlet-adjustment mechanism is in the closed position the ring abuts the tapering surface to eliminate said annular passage.

The inlet-adjustment mechanism in one embodiment further comprises a support portion that is joined by a plurality of circumferentially spaced struts to the ring. The support portion has a radially outer surface that engages the inner surface of the air inlet and is movable along the inner surface either by axial sliding with no rotation or by combined axial and rotational movement such as how a screw moves.

The struts can have any of various cross-sectional shapes, for example, an airfoil cross-sectional shape in a θ-z plane. The number of such struts, and their shapes and thicknesses, can be selected depending on the needs of a particular situation. In one embodiment there are three of the struts circumferentially spaced apart.

The ring can comprise a tubular wall having any of various cross-sectional shapes, for example, an airfoil cross-sectional shape in an r-z plane.

The tubular wall at a trailing edge thereof can define an inside diameter that is between 0.45 and 0.98 times $d_{1S}$, where $d_{1S}$ is a diameter of the inducer portion of the compressor wheel.

The tubular wall has an axial length L and the trailing edge of the tubular wall in the closed position is spaced an axial distance S from a leading edge of the inducer portion of the compressor wheel. The length of the tubular wall should be relatively large in comparison with the spacing distance S.

The spacing distance S advantageously should be as small as practicable. For example, when $S<8.5(d_{1S}-d_r)$, where $d_r$ is the inner diameter of the ring at its trailing edge, the inlet-adjustment mechanism is expected to have a beneficial effect on surge margin, the benefit generally becoming larger as S becomes smaller.

The ring can be formed substantially as a body of revolution having a shape like a funnel. In some embodiments the ring has no openings through its wall. In other embodiments, the wall of the ring has openings that allow some flow through from the interior to the exterior of the ring when the ring is in the open position, but the compressor housing is configured to block the openings when the ring is in the closed position.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE DRAWINGS

The present inventions now will be described more fully hereinafter with reference to the accompanying drawings, in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
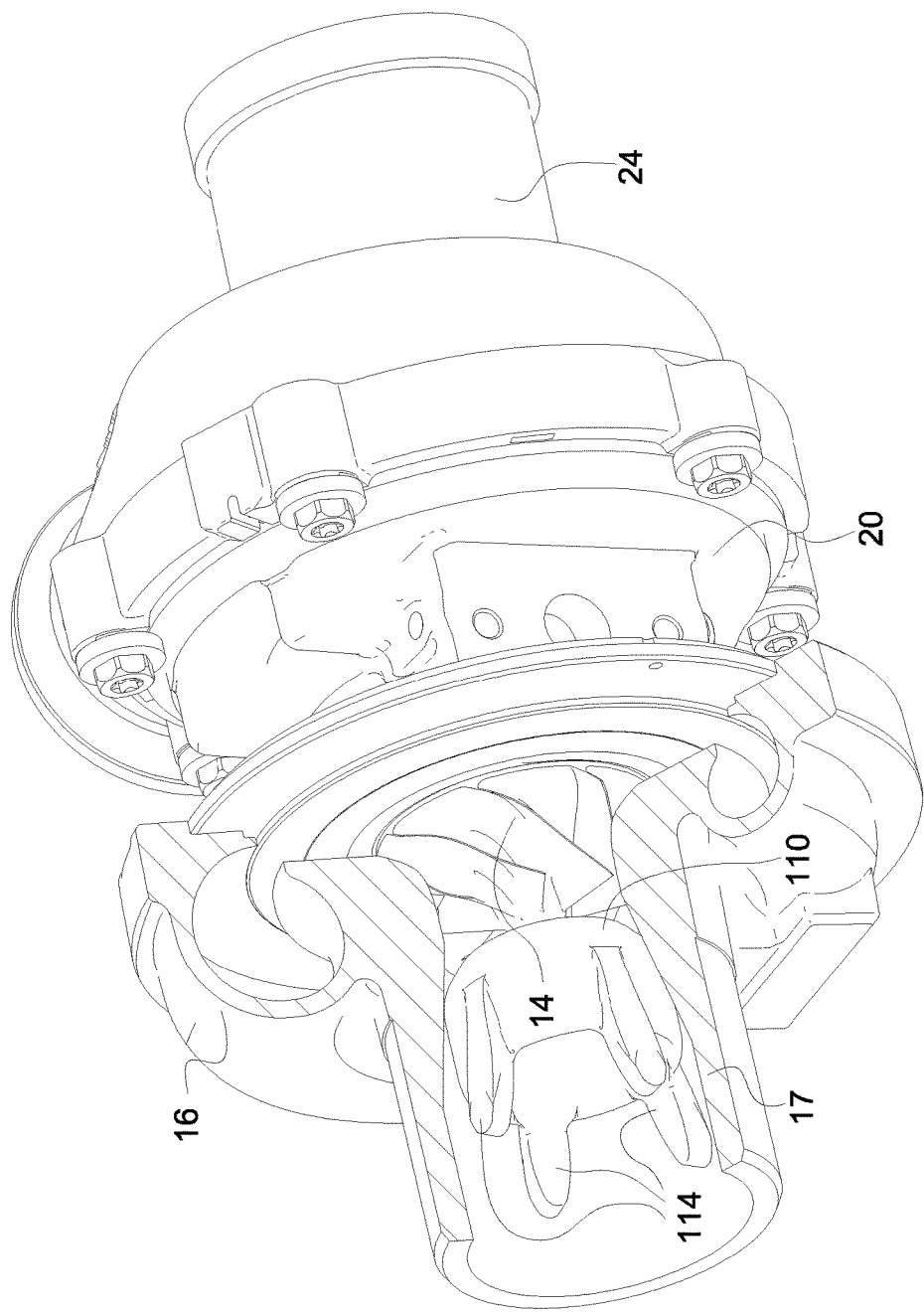
FIG. 1 is a perspective view of a turbocharger, with a portion of the compressor housing cut away to show internal details, in accordance with one embodiment of the invention.
Figure 2:
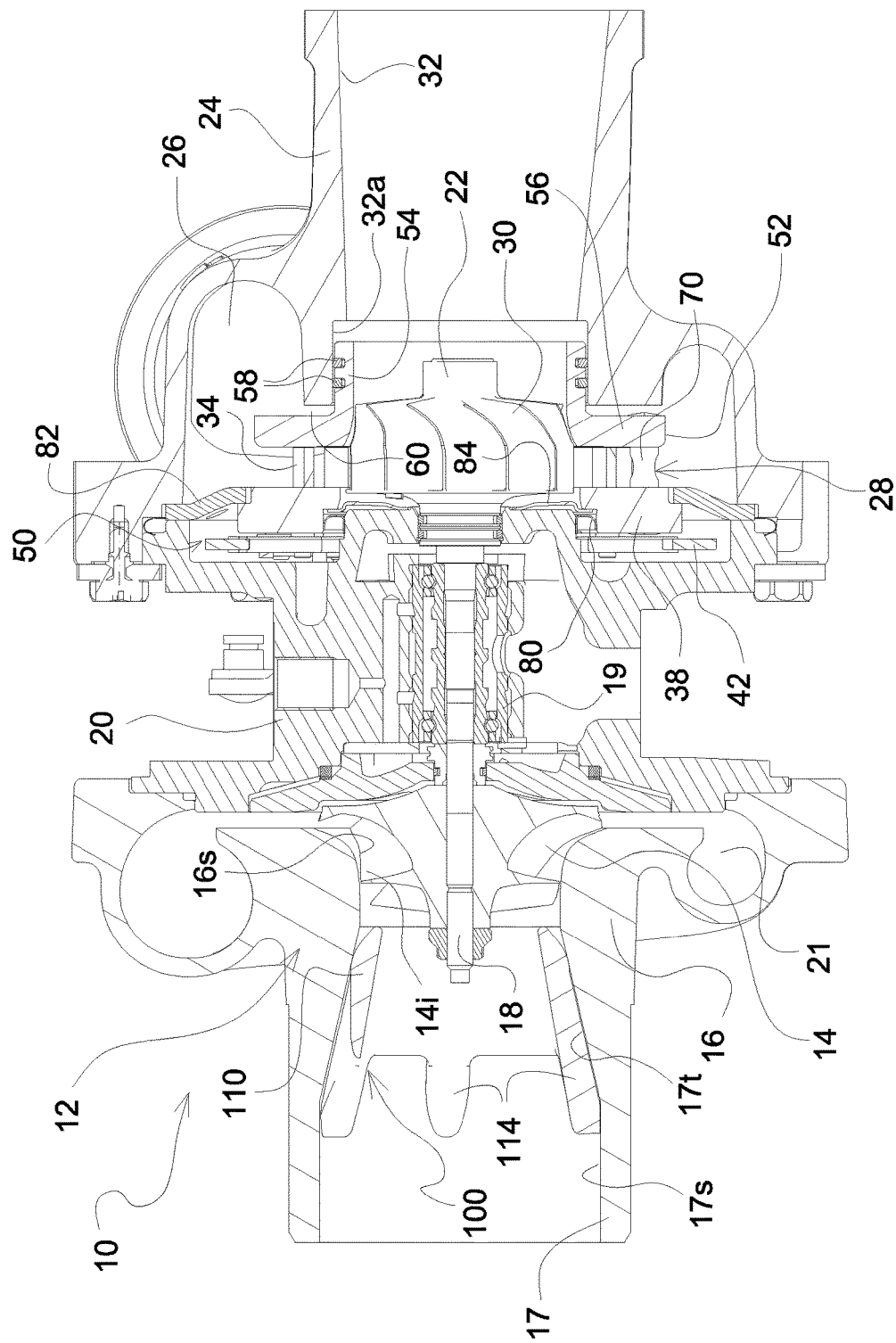
FIG. 2 is an axial cross-sectional view of the turbocharger of FIG. 1, with the inlet-adjustment mechanism in the closed position.

A turbocharger 10 in accordance with one embodiment of the invention is illustrated in cross-sectional view in FIG. 2. The turbocharger comprises a compressor 12 having a compressor wheel or impeller 14 mounted in a compressor housing 16 on one end of a rotatable shaft 18. The compressor housing defines an air inlet 17 for leading air generally axially into the compressor wheel 14. The shaft 18 is supported in bearings 19 mounted in a center housing 20 of the turbocharger. The shaft 18 is rotated by a turbine wheel 22 mounted on the other end of the shaft 18 from the compressor wheel, thereby rotatably driving the compressor wheel, which compresses air drawn in through the compressor inlet and discharges the compressed air generally radially outwardly from the compressor wheel into a volute 21 for receiving the compressed air. From the volute 21, the air is routed to the intake of an internal combustion engine (not shown) for boosting the performance of the engine.

The air inlet 17 has an inner sliding surface 17s that extends for an axial length along a downstream axial direction, followed by a tapering inner surface 17t that extends for an axial length along the downstream axial direction. The tapering inner surface becomes smaller in diameter in the downstream axial direction.

The compressor housing 16 defines a shroud surface 16s that is closely adjacent to the radially outer tips of the compressor blades. The shroud surface 16s defines a curved contour that is generally parallel to the contour of the compressor wheel. At the inlet to the inducer portion 14i of the compressor wheel, the shroud surface 16s has a diameter that is slightly greater than the diameter $d_{1S}$ of the inducer portion 14i.

The turbocharger further includes a turbine housing 24 that houses the turbine wheel 22. The turbine housing defines a generally annular chamber 26 that surrounds the turbine wheel and that receives exhaust gas from the internal combustion engine for driving the turbine wheel. The exhaust gas is directed from the chamber 26 generally radially inwardly through a turbine nozzle 28 to the turbine wheel 22. As the exhaust gas flow through the passages between the blades 30 of the turbine wheel, the gas is expanded to a lower pressure, and the gas discharged from the wheel exits the turbine housing through a generally axial bore 32 therein.

The turbine nozzle 28 is a variable nozzle for varying the cross-sectional flow area through the nozzle so as to regulate flow into the turbine wheel. The nozzle includes a plurality of vanes 34 that are circumferentially spaced about the nozzle. Each vane is affixed to an axle (not shown) that passes through an aperture in a generally annular nozzle ring 38 that is mounted coaxially with respect to the turbine wheel 22. Each axle is rotatable about its axis for rotating the attached vane. The nozzle ring 38 forms one wall of the flow passage of the nozzle 28. Each of the axles has a vane arm (not specifically illustrated) affixed to an end of the axle that protrudes out from the nozzle ring 38, and is engaged by a generally annular unison ring 42 (also referred to herein as an actuator ring) that is rotatable about its axis and that is coaxial with the nozzle ring 38. An actuator (not shown) is connected to the unison ring 42 for rotating it about its axis. When the unison ring is rotated, the vane arms are rotated to cause the axles to rotate about their axes, thereby rotating the vanes 34 so as to vary the cross-sectional flow area through the nozzle 28. As described thus far, the variable nozzle mechanism generally corresponds to a conventional variable nozzle having variable vanes.

In the illustrated embodiment, the variable vane mechanism is provided in the form of a cartridge 50 that is installable into and removable from the turbocharger as a unit. The cartridge 50 comprises the nozzle ring 38, vanes 34, axles, vane arms, and unison ring 42. The cartridge further comprises an insert 52 that has a tubular portion 54 sealingly received into a portion 32a of the bore 32 of the turbine housing, and a nozzle portion 56 extending generally radially out from one end of the tubular portion 54, the nozzle portion 56 being axially spaced from the nozzle ring 38 such that the vanes 34 extend between the nozzle ring 38 and the nozzle portion 56. The bore portion 32a of the turbine housing has a radius that exceeds that of the remainder of the bore 32 by an amount slightly greater than the radial thickness of the tubular portion 54 of the insert 52. The radially outer surface of the tubular portion 54 has at least one circumferential groove, and preferably has two axially spaced grooves as shown in FIG. 2, in each of which a sealing ring 58 is retained for sealingly engaging the inner surface of the bore portion 32a. Advantageously, the outer diameter of the tubular portion 54 of the insert is slightly less than the inner diameter of the bore portion 32a so that a slight gap is defined therebetween, and only the sealing rings 58 make contact with the inner surface of the bore portion 32a. Additionally, there is a gap 60 between the nozzle portion 56 and the adjacent end of the turbine housing at the end of the bore portion 32a. In this manner, the insert 52 is mechanically and thermally decoupled from the turbine housing 24.

A plurality of spacers 70 are connected between the nozzle ring 38 and the nozzle portion 56 of the insert 52 for securing the nozzle ring to the insert and maintaining the desired axial spacing between the nozzle portion of the insert and the nozzle ring.

The cartridge 50 further comprises a heat shroud 80 that is captively retained between the nozzle ring 38 and the center housing 20 when the cartridge is installed onto the center housing. The heat shroud 80 provides sealing between the nozzle ring and center housing to prevent hot exhaust gas from migrating between these parts into the cavity in which the vane arms and unison ring 42 are disposed. The heat shroud 80 advantageously is a resiliently elastic material such as spring steel or the like, and the shroud is configured so that it is compressed in the axial direction between the nozzle ring 38 and the center housing 20 so that the restoring force of the shroud urges the nozzle ring axially (to the right in FIG. 2) against a flange or retainer 82 that is sandwiched between the center housing and the turbine housing, thereby axially locating the nozzle ring (and thus the entire variable nozzle cartridge 50) within the turbocharger. In this regard the cartridge 50 is axially located in substantially the same way described in commonly owned U.S. Pat. No. 8,333,556, the entire disclosure of which is hereby incorporated herein by reference. The cartridge is radially located by a locator ring 84 whose radially outer periphery engages a radially inwardly facing surface of the nozzle ring 38 and whose radially inner periphery engages a radially outwardly facing surface of the center housing 20.

Figure 2A:
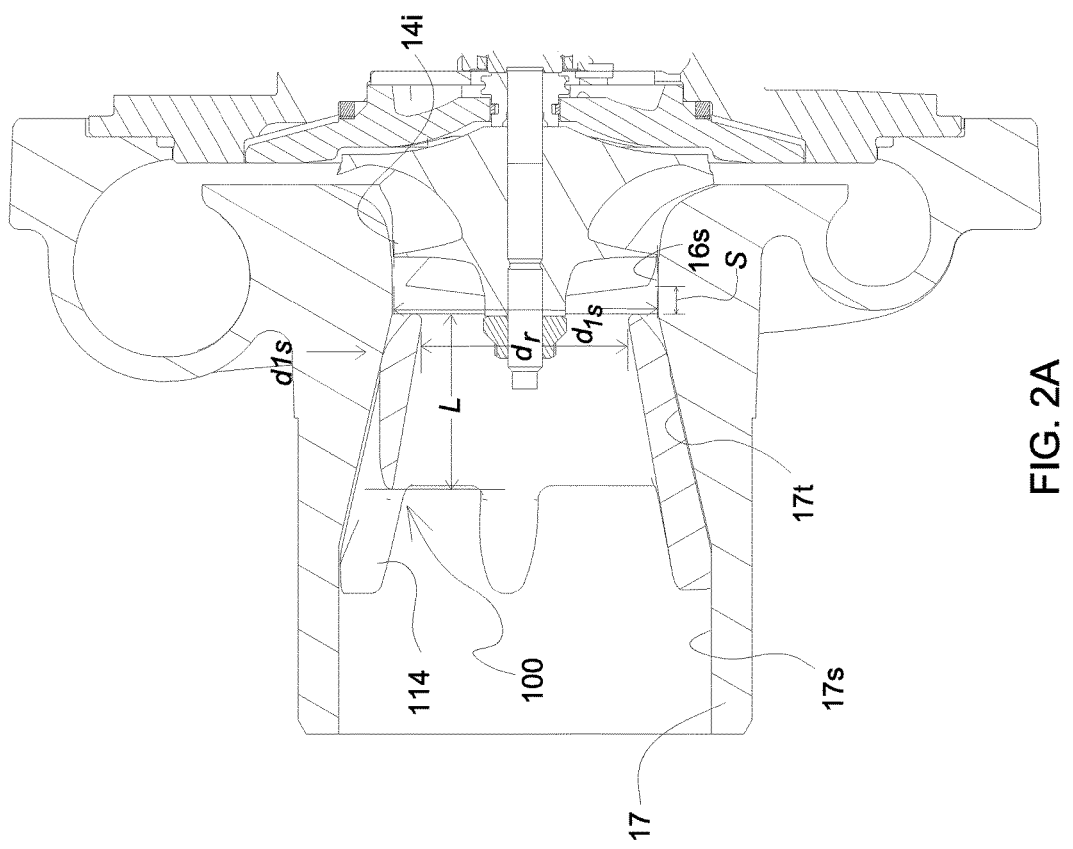
FIG. 2A is an enlarged portion of FIG. 2.

In accordance with the invention, the compressor of the turbocharger includes an inlet-adjustment mechanism 100 disposed in the air inlet 17 of the compressor housing and movable (either axially slidable or helicoidally movable in the manner of a screw) between an open position (FIG. 3) and a closed position (FIGS. 2 and 2A). The inlet-adjustment mechanism comprises an axially elongated ring 110. The ring 110 is arranged so that when the inlet-adjustment mechanism 100 is in the open position (FIG. 3) the ring 110 is spaced from the tapering surface 17t of the air inlet such that there is an annular passage 112 between the tapering surface and the ring for a flow of air therethrough. When the inlet-adjustment mechanism 100 is in the closed position (FIGS. 2 and 2A) the ring 110 abuts the tapering surface 17t to eliminate the annular passage 112.

The ring 110 in the closed position (FIGS. 2 and 2A) extends in the downstream direction substantially to the inducer 14i of the compressor wheel 14, such that an effective diameter of the air inlet at the inducer portion is determined by the inner diameter $d_r$ of the ring 110 at its trailing edge.

The inlet-adjustment mechanism 100 in the illustrated embodiment further comprises a support portion that includes a plurality of circumferentially spaced struts 114 that connect to the ring 110. The support portion has a radially outer surface that engages the sliding surface 17s of the air inlet 17 and is movable along the sliding surface. In the illustrated embodiment the outer surface of the support portion is defined by outer surfaces of the struts 114. Alternatively, however, the support portion could include a further portion (e.g., a ring or the like) connected to the struts 114, and such further portion could define the outer surface that slides along the cylindrical surface of the inlet.

The struts 114 can have any of various cross-sectional shapes, for example, an airfoil cross-sectional shape in a θ-z plane. The struts can be various in number. The illustrated embodiment has four struts, but other numbers can be used instead.

With reference to FIG. 2A, the ring 110 comprises a tubular wall that can have any of various cross-sectional shapes, for example, an airfoil cross-sectional shape in an r-z plane. The tubular wall at a trailing edge thereof defines an inside diameter $d_r$ that is between 0.45 and 0.98 times $d_{1S}$, where $d_{1S}$ is a diameter of the inducer portion 14i of the compressor wheel.

The tubular wall has an axial length L and the trailing edge of the tubular wall in the closed position is spaced an axial distance S from a leading edge of the inducer portion of the compressor wheel. The length of the tubular wall should be relatively large in comparison with the spacing distance S.

The spacing distance S advantageously should be as small as practicable. For example, when $S<8.5(d_{1S}-d_r)$, the inlet-adjustment mechanism is expected to have a beneficial effect on surge margin, the benefit generally becoming larger as S becomes smaller. When S is larger than that value, it is expected that the benefit on surge margin will be negligible or nonexistent. This rule of thumb, however, is based on a limited amount of investigations in a particular turbocharger configuration, and thus cannot be viewed as a rule that applies to all turbocharger configurations. Accordingly, not all of the appended claims are restricted to S values abiding by this rule of thumb.

The inlet-adjustment mechanism 100 enables adjustment of the effective size or diameter of the inlet into the compressor wheel 14. As illustrated in FIGS. 2 and 2A, when the inlet-adjustment mechanism is in the closed position, the effective diameter of the inlet into the compressor wheel is dictated by the inside diameter $d_r$ of the ring 110 at its trailing edge. In order for this effect to be achieved, the axial spacing distance S must be as small as practicable, as previously described, so that the entire airflow into the compressor wheel passes through the interior of the ring 110 and there is insufficient distance downstream of the ring's trailing edge for the flow to expand to the full diameter of the inducer portion 14i of the compressor wheel 14 by the time the air encounters it. The inlet diameter is thereby effectively reduced to a value that is dictated by the ring diameter $d_r$.

Figure 3:
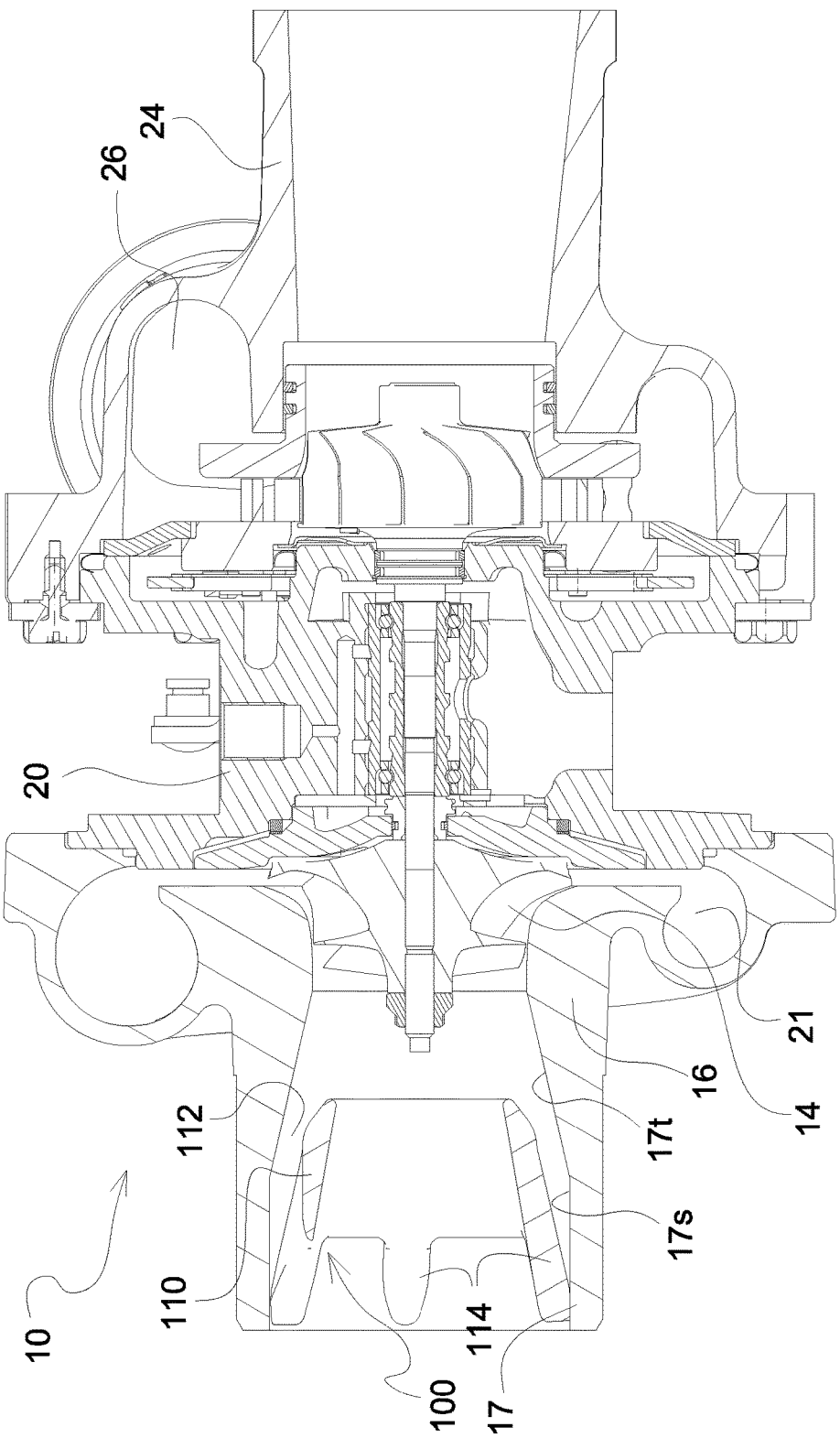
FIG. 3 is a view similar to FIG. 2, but with the inlet-adjustment mechanism in the open position.
Figure 4:
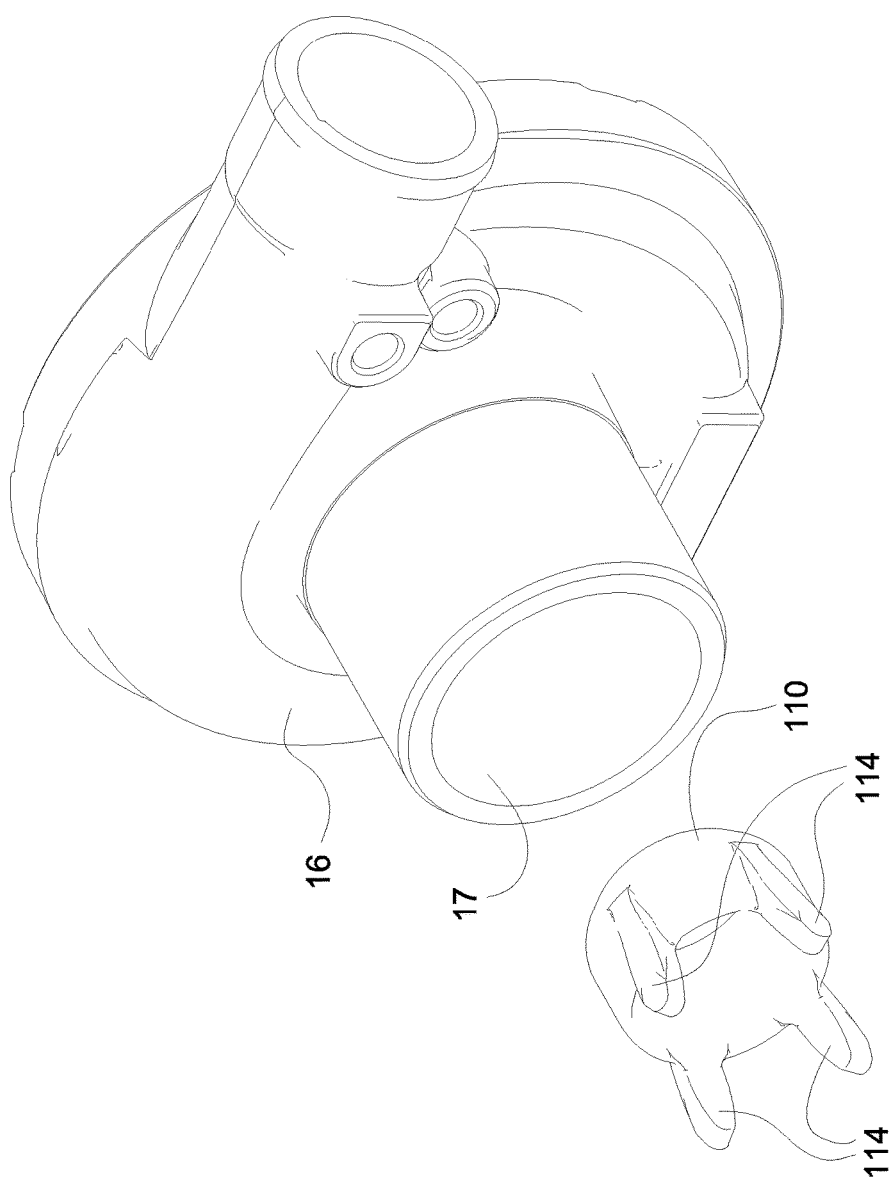
FIG. 4 is an exploded view of the turbocharger of FIG. 1.
Figure 5:
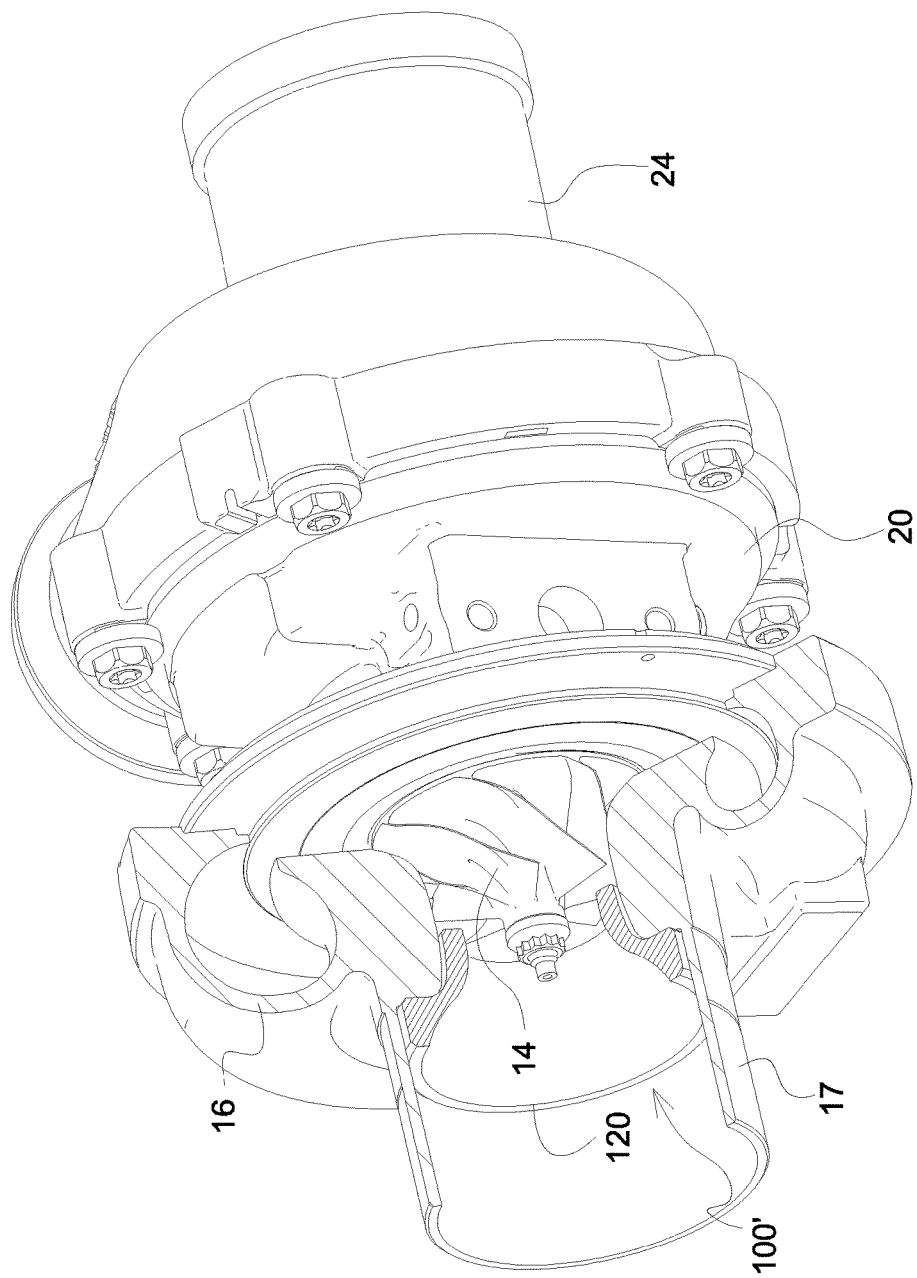
FIG. 5 is a perspective view of a turbocharger, with a portion of the compressor housing cut away to show internal details, in accordance with another embodiment of the invention.

On the other hand, when the inlet-adjustment mechanism 100 is moved to the open position of FIG. 3, some portion of the air entering the inlet 17 is able to flow through the annular space 112 between the ring 110 and the inner surface of the inlet, and thus the effective diameter of the inlet is the full diameter of the inlet (as defined by the shroud surface 16s) at the inducer portion 14i.

At low flow rates (e.g., low engine speeds), the inlet-adjustment mechanism 100 can be placed in the closed position of FIGS. 2 and 2A. This can have the effect of reducing the effective inlet diameter and thus of increasing the flow velocity into the compressor wheel. The result will be a reduction in compressor blade incidence angles, effectively stabilizing the flow (i.e., making blade stall and compressor surge less likely). In other words, the surge line of the compressor will be moved to lower flow rates (to the left on a map of compressor pressure ratio versus flow rate).

At intermediate and high flow rates, the inlet-adjustment mechanism 100 can be opened as in FIG. 3. This can have the effect of increasing the effective inlet diameter so that the compressor regains its high-flow performance and choke flow essentially as if the inlet-adjustment mechanism were not present and as if the compressor had a conventional inlet matched to the wheel diameter at the inducer portion of the wheel.

Figure 6:
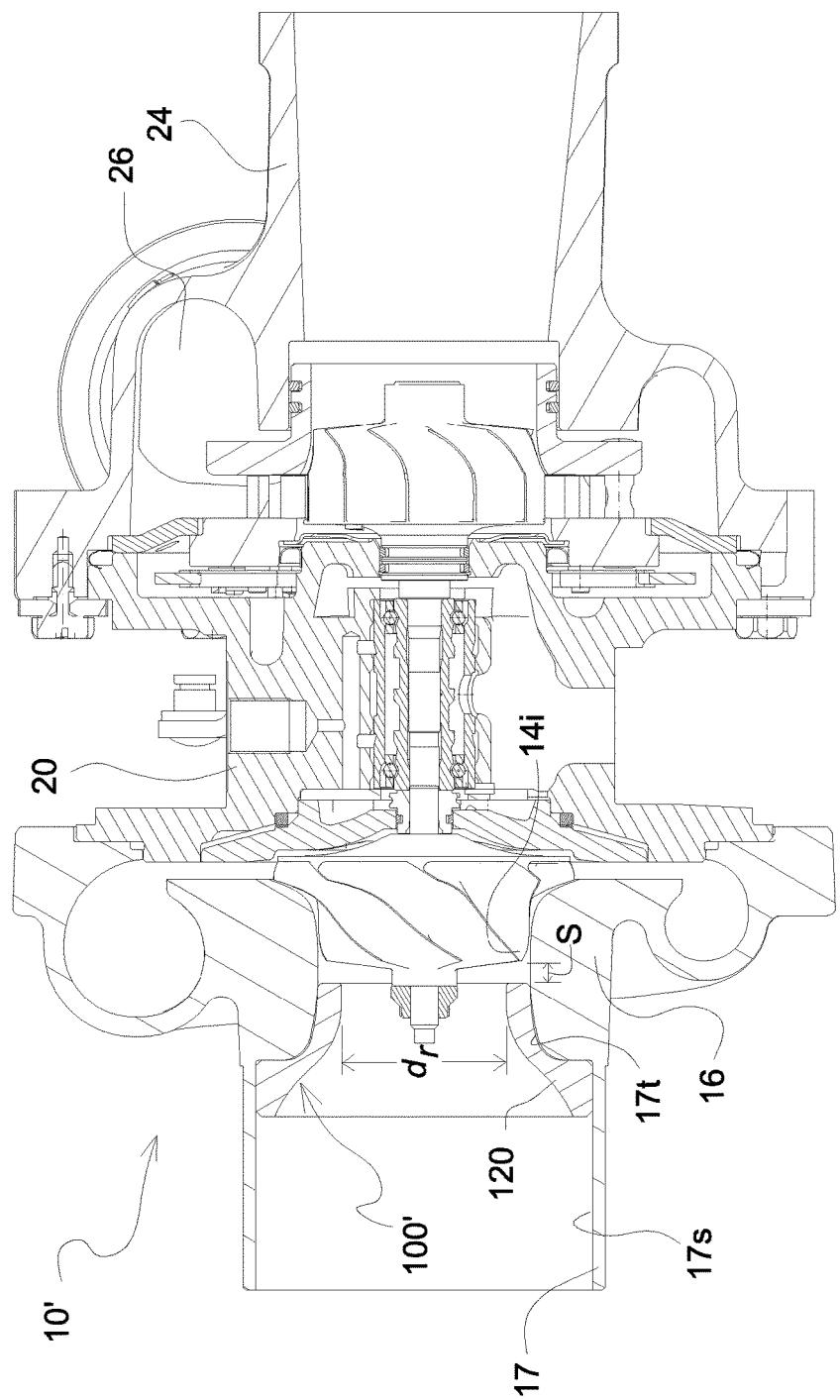
FIG. 6 is an axial cross-sectional view of the turbocharger of FIG. 5, with the inlet-adjustment mechanism in the closed position.

A second embodiment of the invention is illustrated in FIGS. 5-8. The turbocharger 10' of the second embodiment is generally similar to the first embodiment described above, except for the configuration of the inlet-adjustment mechanism 100'. The inlet-adjustment mechanism 100' of the second embodiment comprises an axially elongated ring 120 that lacks the struts of the previous embodiment. Instead, the ring 120 is formed substantially as a body of revolution having a shape like a funnel. When the ring 120 is in the closed position of FIGS. 5 and 6, the ring abuts the tapering surface 17t of the compressor inlet and therefore all of the air must flow through the interior of the ring. Accordingly, because the ring in this position is closely adjacent to the inducer portion of the compressor wheel (i.e., the spacing distance S in FIG. 6 is relatively small), the effective inlet diameter at the inducer portion is dictated by the inner diameter $d_r$ of the ring at its trailing edge, which is substantially smaller than the diameter of the shroud surface 16s at the inducer.

Figure 7:
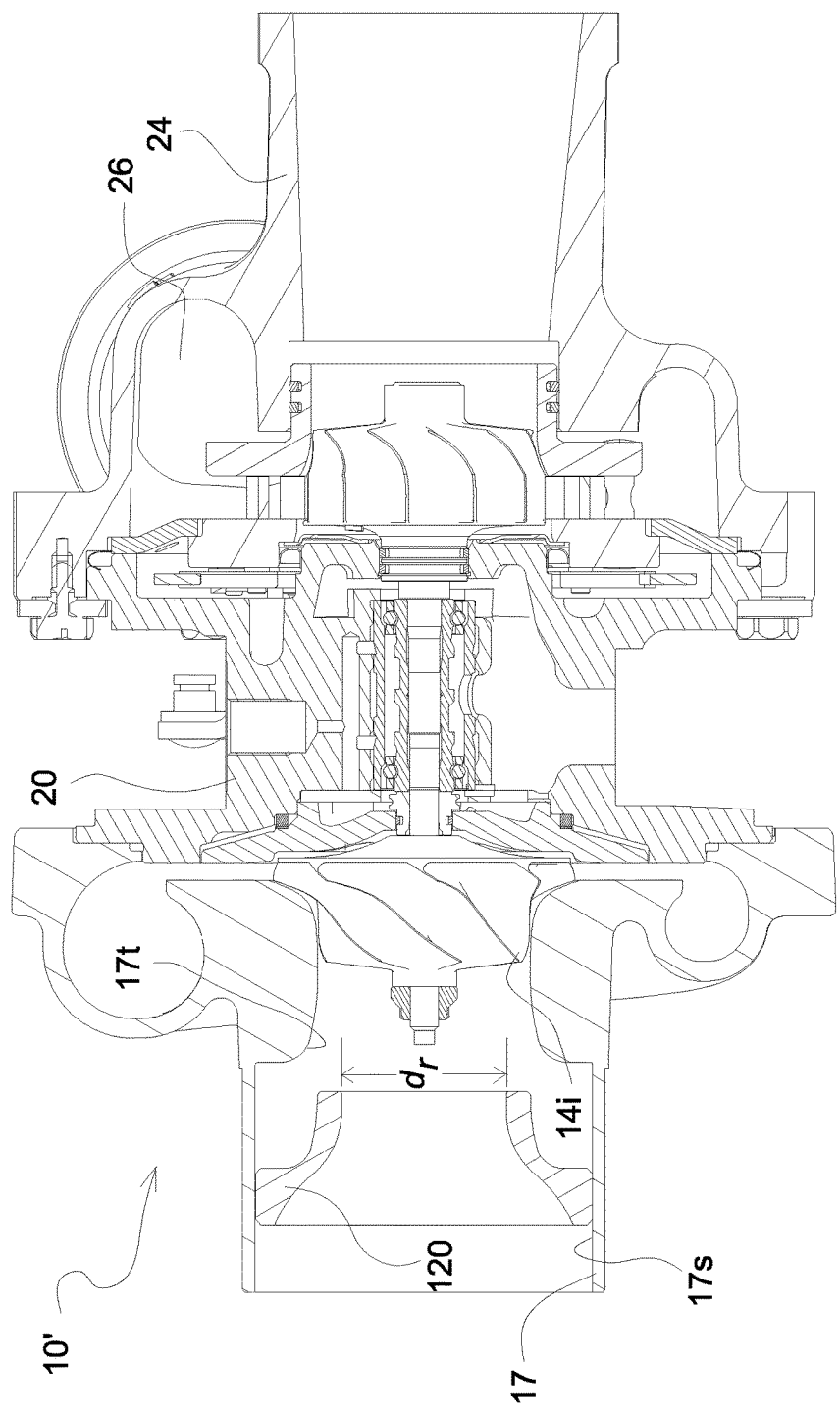
FIG. 7 is a view similar to FIG. 6, but with the inlet-adjustment mechanism in the open position.
Figure 8:
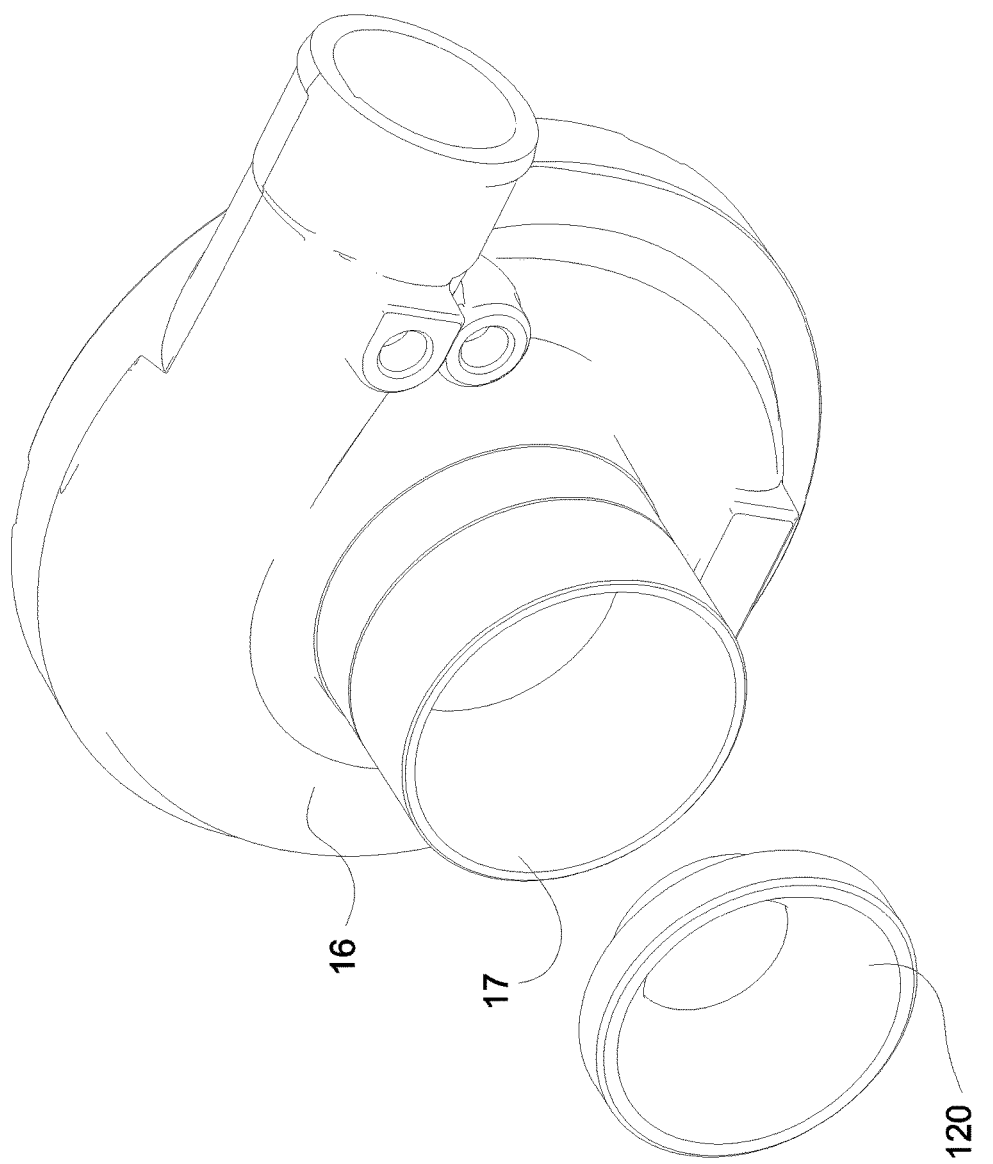
FIG. 8 is an exploded view of the turbocharger of FIG. 5.

On the other hand, when the ring 120 is slid to the open position of FIG. 7, there is a substantial axial spacing between the trailing edge of the ring and the inducer portion 14i of the compressor wheel. As a result, even though all of the flow still passes through the interior of the ring (because the ring engages the inner surface of the cylindrical portion 17s of the air inlet over a full 360 degrees), there is sufficient distance from the end of the ring to the inducer portion to allow the flow to re-expand to a larger diameter before reaching the inducer portion 14i. Accordingly, the effective inlet diameter is nearly the full inlet diameter at the inducer. If the inner diameter of the ring 120 is too small such that the flow chokes in the orifice under certain conditions, a bypass solution can be implemented, as described below in connection with a further embodiment.

Figure 9:
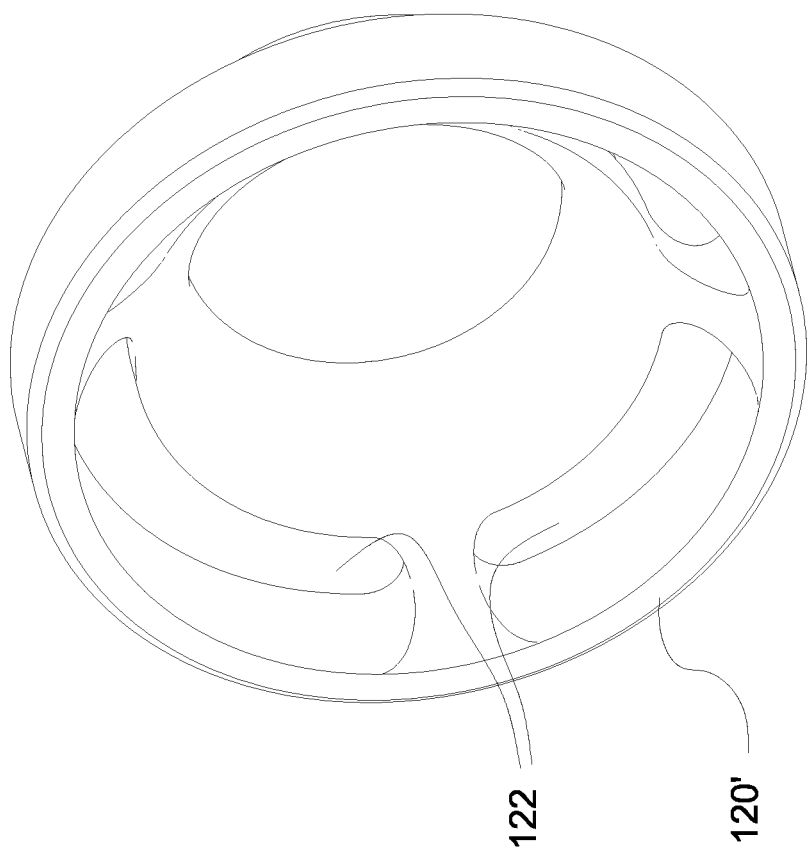
FIG. 9 is a perspective view of an inlet-adjustment ring in accordance with a further embodiment of the invention.
Figure 10:
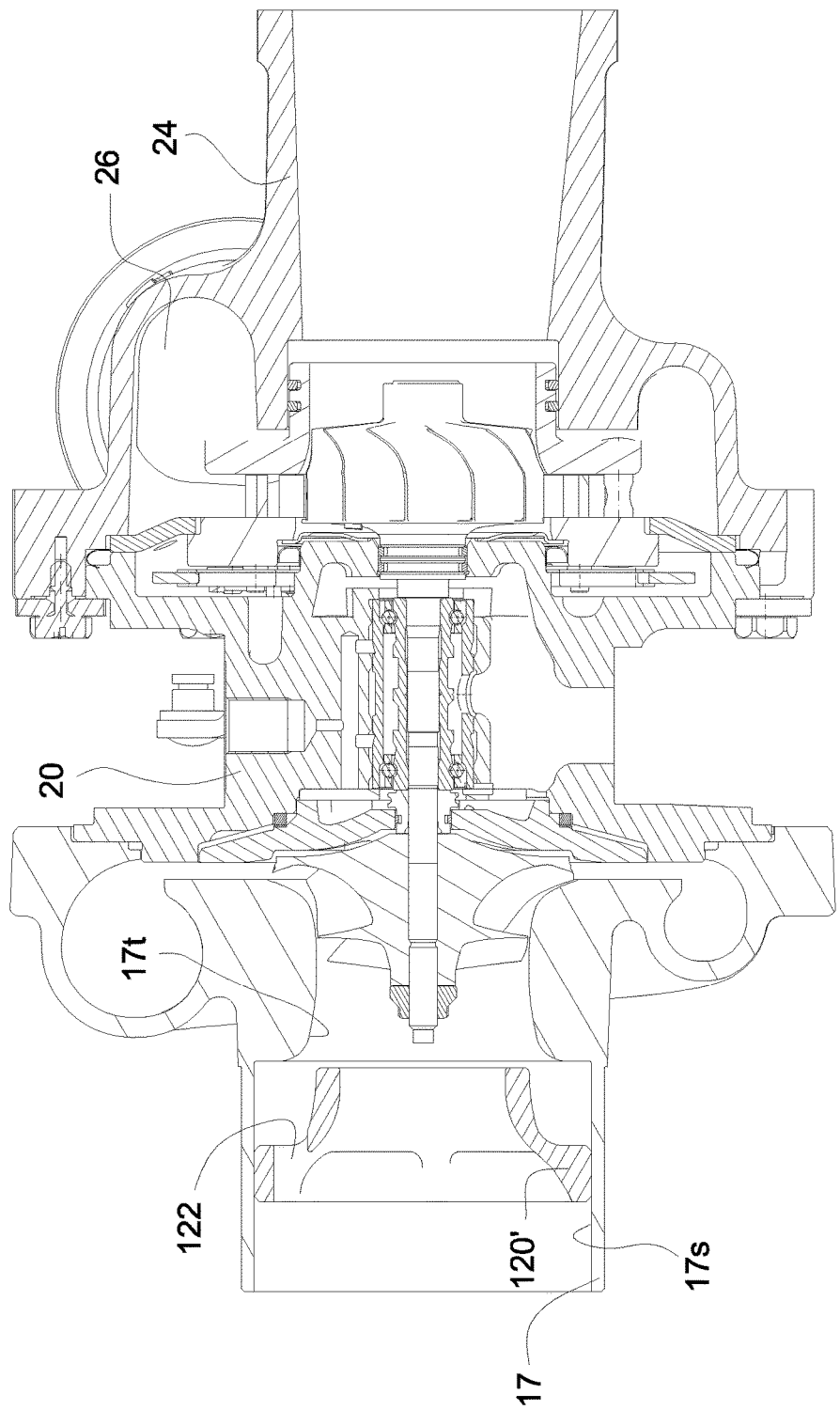
FIG. 10 is a cross-sectional view of a turbocharger having the ring of FIG. 9, in the open position.
Figure 11:
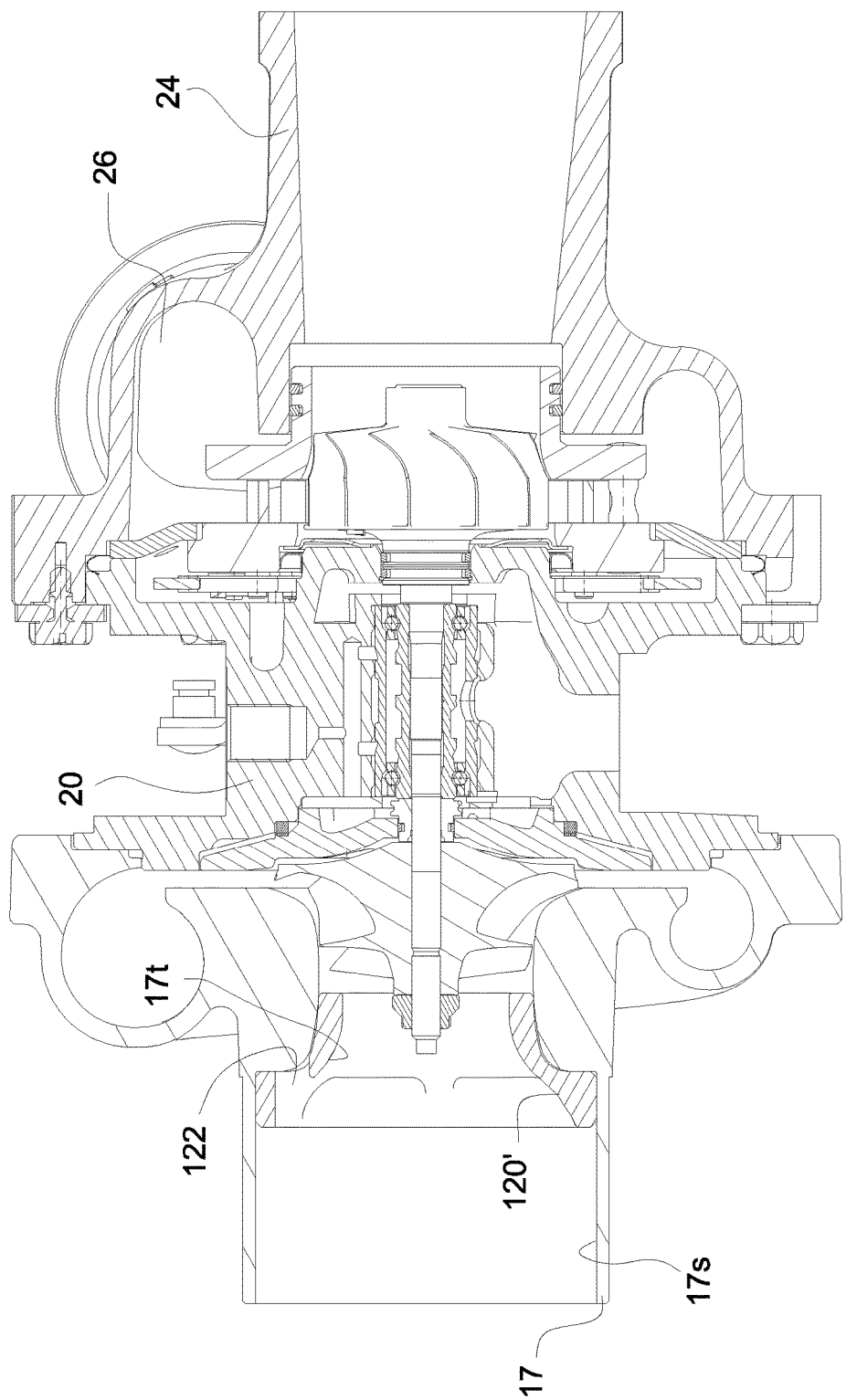
FIG. 11 is a view similar to FIG. 10, with the ring in the closed position.

Such a further embodiment of the invention is illustrated in FIGS. 9-11. This embodiment is substantially similar to the embodiment of FIGS. 5-8, except for the configuration of the ring. In the further embodiment, the ring 120' is a body of revolution shaped like a funnel, but it includes a number of openings 122 through the wall of the ring to allow air to pass through under certain conditions. When the ring is in the open position as in FIG. 10, the majority of the air will flow through the interior of the ring as in the previous embodiment, but some air will flow through the openings 122 from the interior to the exterior of the ring before the air encounters the inducer portion 14i of the compressor wheel. This helps facilitate a substantially complete filling of the entire air inlet just upstream of the inducer portion 14i. When the ring is in the closed position of FIG. 11, the tapering surface 17t of the compressor housing closes off the openings 122 so that air is substantially prevented from passing through the openings, and hence all of the air must flow through the interior of the ring 120'.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger, comprising:
   a turbine housing and a turbine wheel mounted in the turbine housing and connected to a rotatable shaft for rotation therewith, the turbine housing receiving exhaust gas and supplying the exhaust gas to the turbine wheel;
   a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air axially into the compressor wheel, the compressor housing further defining a volute for receiving compressed air discharged radially outwardly from the compressor wheel, the air inlet having an inner surface a portion of which comprises a cylindrical sliding surface that extends for an axial length along a downstream direction, followed by a shroud surface that is adjacent to outer tips of the blades of the compressor wheel, the air inlet further defining a tapering inner surface that is axially disposed between the sliding surface and the shroud surface and extends for an axial length along the downstream direction, the tapering inner surface being smaller in diameter at a downstream end of the tapering inner surface than at an upstream end thereof;

a compressor inlet-adjustment mechanism disposed in the air inlet of the compressor housing and movable between an open position and a closed position, the inlet-adjustment mechanism comprising an axially elongated ring comprising a tubular wall whose inner surface becomes smaller in diameter in the downstream direction toward the compressor wheel such that the diameter of the inner surface is smaller at a downstream end of the ring than at an upstream end of the ring, the downstream end of the ring defining a trailing edge, the inner diameter of the ring at the trailing edge being smaller than an inner diameter of the shroud surface of the compressor housing at the inducer portion of the compressor wheel, wherein the inlet-adjustment mechanism further comprises a support portion that is joined by a plurality of circumferentially spaced struts to the ring, the support portion having a radially outer surface that engages the cylindrical sliding surface of the air inlet and is movable along the cylindrical sliding surface, wherein the ring is arranged so that when the inlet-adjustment mechanism is in the open position the trailing edge of the ring is spaced from the tapering inner surface of the air inlet such that there is an annular passage between the tapering inner surface and the ring for a flow of air therethrough and the trailing edge is axially spaced relatively farther upstream from the inducer portion such that an effective diameter of the air inlet at the inducer portion is determined by the shroud surface, and wherein the trailing edge of the ring in the closed position abuts the tapering inner surface to eliminate said annular passage and is axially spaced relatively closer to the inducer portion of the compressor wheel such that the effective diameter of the air inlet at the inducer portion is determined by the inner diameter of the ring at the trailing edge.

2. The turbocharger of claim 1, wherein the struts have an airfoil cross-sectional shape in a θ-z plane.

3. The turbocharger of claim 1, wherein there are four said struts circumferentially spaced apart.

4. The turbocharger of claim 1, wherein the tubular wall has an airfoil cross-sectional shape in an r-z plane.

5. The turbocharger of claim 1, wherein the diameter of the inner surface of the ring at the trailing edge is between 0.45 and 0.98 times $d_{1S}$, where $d_{1S}$ is a diameter of the inducer portion of the compressor wheel.

6. The turbocharger of claim 5, wherein the tubular wall has an axial length L and the trailing edge of the tubular wall in the closed position is spaced an axial distance S from a leading edge of the inducer portion of the compressor wheel, and wherein L is larger than S.

7. The turbocharger of claim 6, wherein $S<8.5(d_{1S}-d_r)$, where $d_r$ is the diameter of the inner surface of the ring at the trailing edge thereof.

8. A turbocharger, comprising:

a turbine housing and a turbine wheel mounted in the turbine housing and connected to a rotatable shaft for rotation therewith, the turbine housing receiving exhaust gas and supplying the exhaust gas to the turbine wheel;

a centrifugal compressor assembly comprising a compressor housing and a compressor wheel mounted in the compressor housing and connected to the rotatable shaft for rotation therewith, the compressor wheel having blades and defining an inducer portion, the compressor housing defining an air inlet for leading air axially into the compressor wheel, the compressor housing further defining a volute for receiving compressed air discharged radially outwardly from the compressor wheel, the air inlet having an inner surface a portion of which comprises a cylindrical sliding surface that extends for an axial length along a downstream direction, followed by a shroud surface that is adjacent to outer tips of the blades of the compressor wheel;

a compressor inlet-adjustment mechanism disposed in the air inlet of the compressor housing and movable between an open position and a closed position, the inlet-adjustment mechanism comprising an axially elongated ring whose inner surface becomes smaller in diameter in the downstream direction toward the compressor wheel such that the diameter of the inner surface is smaller at a downstream end of the ring than at an upstream end of the ring, wherein the ring is formed by a wall configured substantially as a body having a funnel shape, wherein the wall of the ring includes openings through the wall to allow air to pass through the openings, the downstream end of the ring defining a trailing edge, the inner diameter of the ring at the trailing edge being smaller than an inner diameter of the shroud surface of the compressor housing at the inducer portion of the compressor wheel, wherein the ring is arranged so that when the inlet-adjustment mechanism is in the open position the trailing edge of the ring is axially spaced relatively farther upstream from the inducer portion such that an effective diameter of the air inlet at the inducer portion is determined by the shroud surface, and wherein the trailing edge of the ring in the closed position is axially spaced relatively closer to the inducer portion of the compressor wheel such that the effective diameter of the air inlet at the inducer portion is determined by the inner diameter of the ring at the trailing edge, and wherein the openings in the ring are unblocked when the ring is in the open position so that air passes through the openings from an interior to an exterior of the ring before encountering the inducer portion of the compressor wheel, and the compressor housing is configured to block the openings when the ring is in the closed position so that air is substantially prevented from passing through the openings.

* * * * *